United States Patent
Furuse et al.

(10) Patent No.: US 8,327,970 B2
(45) Date of Patent: Dec. 11, 2012

(54) TRANSMISSION CONTROL APPARATUS FOR SADDLE-RIDE TYPE VEHICLE

(75) Inventors: Hiroshi Furuse, Wako (JP); Kenji Morita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 284 days.

(21) Appl. No.: 12/698,181

(22) Filed: Feb. 2, 2010

(65) Prior Publication Data

US 2010/0212992 A1 Aug. 26, 2010

(30) Foreign Application Priority Data

Feb. 26, 2009 (JP) ................................. 2009-044777

(51) Int. Cl.
B60K 17/08 (2006.01)
B60K 17/16 (2006.01)
(52) U.S. Cl. .................... 180/336; 74/473.16; 74/473.21
(58) Field of Classification Search .................. 180/336, 180/219; 74/473.1, 473.16, 473.21, 473.24, 74/473.25, 473.36, 478; 447/34
See application file for complete search history.

(56) References Cited

U.S. PATENT DOCUMENTS

| 3,421,384 | A | * | 1/1969 | Okamoto et al. | 74/473.21 |
| 4,491,031 | A | * | 1/1985 | Ooka | 74/337.5 |
| 7,146,871 | B2 | * | 12/2006 | Ozaki et al. | 74/335 |
| 7,600,446 | B2 | * | 10/2009 | Mizuno et al. | 74/473.1 |
| 2006/0065068 | A1 | * | 3/2006 | Mizuno et al. | 74/473.1 |
| 2006/0283648 | A1 | | 12/2006 | Nishiura | |
| 2009/0205455 | A1 | * | 8/2009 | Kosugi | 74/473.21 |
| 2009/0249914 | A1 | * | 10/2009 | Kashiwai et al. | 74/473.21 |
| 2010/0212992 | A1 | * | 8/2010 | Furuse et al. | 180/336 |
| 2010/0218634 | A1 | * | 9/2010 | Matusmoto et al. | 74/473.24 |
| 2011/0226080 | A1 | * | 9/2011 | Ieda et al. | 74/473.36 |

FOREIGN PATENT DOCUMENTS

| EP | 0 466 196 A1 | 7/1991 |
| EP | 1 772 365 A1 | 4/2007 |
| JP | 2007-283903 A | 11/2007 |
| JP | 2008-262233 | 10/2008 |
| WO | 2006011441 | 2/2006 |

OTHER PUBLICATIONS

Detector definition. Online dictionary, printed Apr. 27, 2012.*
European Search Report application No. 10154303 dated Jun. 24, 2010.

* cited by examiner

Primary Examiner — Ruth Ilan
Assistant Examiner — Karen A Beck
(74) Attorney, Agent, or Firm — Squire Sanders (US) LLP

(57) ABSTRACT

In certain embodiments, a vehicle includes a vehicle body frame including a main frame extending rearward from a head pipe, and a pivot frame extending downward from a rear portion of the main frame. An engine is supported by the vehicle body frame. A shift pedal is provided, with which a driver performs a gear-shifting operation. A base part is provided, to which a detector and a moveable part are attached. The detector is configured to detect the gear-shifting operation, and the moveable part is configured such that an operation thereof is detected by the detector. A link is provided, which links the shift pedal and the moveable part to each other. The base part is detachably provided to the engine, and the base part and the moveable part are configured, in a plan view, inward of an outer side surface of the main frame in a vehicle width direction.

9 Claims, 9 Drawing Sheets

TRANSMISSION CONTROL APPARATUS FOR SADDLE-RIDE TYPE VEHICLE

BACKGROUND

1. Field

The present invention relates to a transmission control apparatus for a saddle-ride type vehicle.

2. Description of Related Art

A technique has been developed in which, once a gear-shifting operation is performed by use of a shift pedal in order to perform gear shifting on a transmission of a saddle-ride type vehicle, a sensor detects this gear-shifting operation, and an onboard computer activates an actuator on the basis of an output from this sensor, and thus a shift drum on a transmission unit side is rotated, so that gear-shifting to a desired gear position is performed. This is a so-called by-wire transmission.

A transmission control apparatus constituted of the shift pedal to the sensor causes a transmission drive unit including the actuator to drive the transmission unit. Thereby, a series of gear-shifting operations of the transmission unit is carried out.

The following two types are known as such a conventional transmission control apparatus for a saddle-ride type vehicle. One type of transmission control apparatus is configured to detect, by a sensor, the operation of the shift pedal, and concurrently to make click sounds while the shift pedal is operated as discussed in Patent Document 1, for instance. The other type of transmission control apparatus is configured to detect the operation of the shift pedal by use of paired switches, as discussed in Patent Document 2, for instance.

According to FIG. 1 of Patent Document 1, a gear change pedal mechanism includes a gear change pedal 18, a potentiometer 125b configured to detect that a shift change is performed by use of this gear change pedal 18, and click generating means 150 configured to generate click sounds and vibrations similar to a sensation which is actually experienced when the gears are changed, when the gear change pedal 18 is operated.

Patent Document 2, in particular FIG. 16A, discloses a system that utilizes the technique described in Patent Document 1. In addition, Patent Document 2 discloses a transmission control apparatus in which components of the configuration based on the technique described in Patent Document 1 are placed in different locations. Specifically, according to FIG. 13 of Patent Document 2, a shift pedal 410 is linked to a lever member 408 by use of a link member 480, and shift pedal detection switches 422, 423 are arranged on the two sides of the lever member 408.

A support plate 402 is attached to an engine case 14, a shaft 409 is rotatably attached to this support plate 402, and the lever member 408 is attached to this shaft 409. Furthermore, the shift pedal detection switches 422, 423 are attached to the support plate 402.

Once the shift pedal 410 is operated, the lever member 408 is rotated in a predetermined direction by use of the link member 480. When the lever member 408 hits one of the shift pedal detection switches 422, 423, the one of the shift pedal detection switches 422, 423 is turned on. On the basis of a signal representing this detection, an engine control unit activates the actuator. Consequently, the shift shaft is rotated, and the shift operation is accordingly carried out.

Patent Document 1 corresponds to Japanese Patent Application Publication No. 2008-262233, and Patent Document 2 corresponds to International Publication No. 2006/011441.

In Patent Document 2, the support plate 402, the shaft 409, the lever member 408 and the shift pedal detection switches 422, 423 are exposed to a side of the vehicle body. For this reason, in a case where, for instance, the vehicle tumbles sideways, load is likely to be applied to these transmission control parts from the side.

SUMMARY

An object of the present invention is to provide a saddle-ride type vehicle which is configured with consideration given to the load acting from the side of the vehicle.

In certain embodiments, therefore, the vehicle includes a vehicle body frame including a main frame extending rearward from a head pipe, and a pivot frame extending downward from a rear portion of the main frame. An engine is supported by the vehicle body frame. A shift pedal is provided, with which a driver performs a gear-shifting operation. A base part is provided, to which a detector and a moveable part are attached. The detector is configured to detect the gear-shifting operation, and the moveable part is configured such that an operation thereof is detected by the detector. A link is provided, which links the shift pedal and the moveable part to each other. The base part is detachably provided to the engine, and the base part and the moveable part are configured, in a plan view, inward of an outer side surface of the main frame in a vehicle width direction.

According to certain embodiments of the present invention, the base part and the movable part are placed, in a plan view, inward of the outer side surface of the main frame in the vehicle width direction. Thus, it is possible to effectively protect the base part, the detector and the movable part by use of the main frame and the pivot frame, even in the case where the vehicle receives load from its side.

According to embodiments of the present invention, the base part is attached to the vehicle body frame. Thus, it is possible to firmly hold the base part by use of the vehicle body frame.

According to the another aspect of the present invention, the base part is attached to the engine. Thus, it is possible for the base part to be easily attached to, and detached from, the engine.

According to yet another aspect of embodiments of the present invention, the base part is placed adjacent to the rear of the shift actuator which is attached to the engine, and which is configured to generate a drive force for gear shifting. Accordingly, the shift actuator and the vehicle body frame are arranged around the base part. Thus, it is possible to protect the base part by use of the shift actuator and the vehicle body frame.

According to another aspect of the present invention, the base part includes the plate-shaped portion configured to pivotally support the movable part. The upright wall portion is erected upright from the front edge portion of this plate-shaped portion to the side of the vehicle body. This upright wall portion is attached to the flange portion of the shift actuator. Thus, it is possible for the base part to obtain the rigidity with which the base part withstands load acting on the base part from the shift pedal, when the plate-shaped portion and the upright wall portion are formed in the base part. Furthermore, it is possible to make the base part resist resonating with vibrations of the vehicle body.

According to other aspects of the present invention, the movable part includes the rotary shaft which is connected to the detector, and which is rotatably supported by the base part. The link arm is attached to this rotary shaft. The click feeling generating plate having the front end formed in the waveform is attached to the rotary shaft, and the arm with a roller to be pressed to the waveform portion of the click feeling generating plate is rotatably provided to the plate-shaped portion of the base part. Thus, it is possible to place the click feeling generating mechanism constituted of the click feeling generating plate and the arm with a roller, in the back of the upright wall portion of the base part. Hence, it is possible to provide the transmission control apparatus in a compact manner.

According to the other aspects of the present invention, the click feeling generating plate is provided with the stopper long hole configured to restrain the rotation. The curved portion is bent toward the inside of the vehicle body in such a way as to extend along the rotary shaft, and whose end portion is formed wider. In addition, the plate-shaped portion is provided with the stopper bolt which is inserted in the stopper long hole, and which thus plays a role of a stopper. Furthermore, the coil portion of the snap pin is wound around the rotary shaft, and the two branch portions of the snap pin are placed in such a way as to be hooked around the two side edges of the curved portion, and concurrently in such a way as to sandwich the stopper bolt. Thus, it is possible to simply configure the stopper mechanism and the return mechanism of the shift pedal by including only the click feeling generating plate, the stopper bolt and the snap pin. Hence, it is possible to decrease the number of parts constituting the stopper mechanism of the shift pedal, and consequently possible to reduce the costs.

According to the other aspects of the present invention, the rear, upper and lower portions of the base part are covered with the cover, and this cover is provided with the vent hole in its upper surface. Thus, it is possible for this cover to protect the base part and the mechanism parts of the base part by covering them, and concurrently possible to prevent heat transmitted from the engine from staying inside the cover.

DETAILED DESCRIPTION OF PREFERRED EMBODIMENTS

Figure 1:
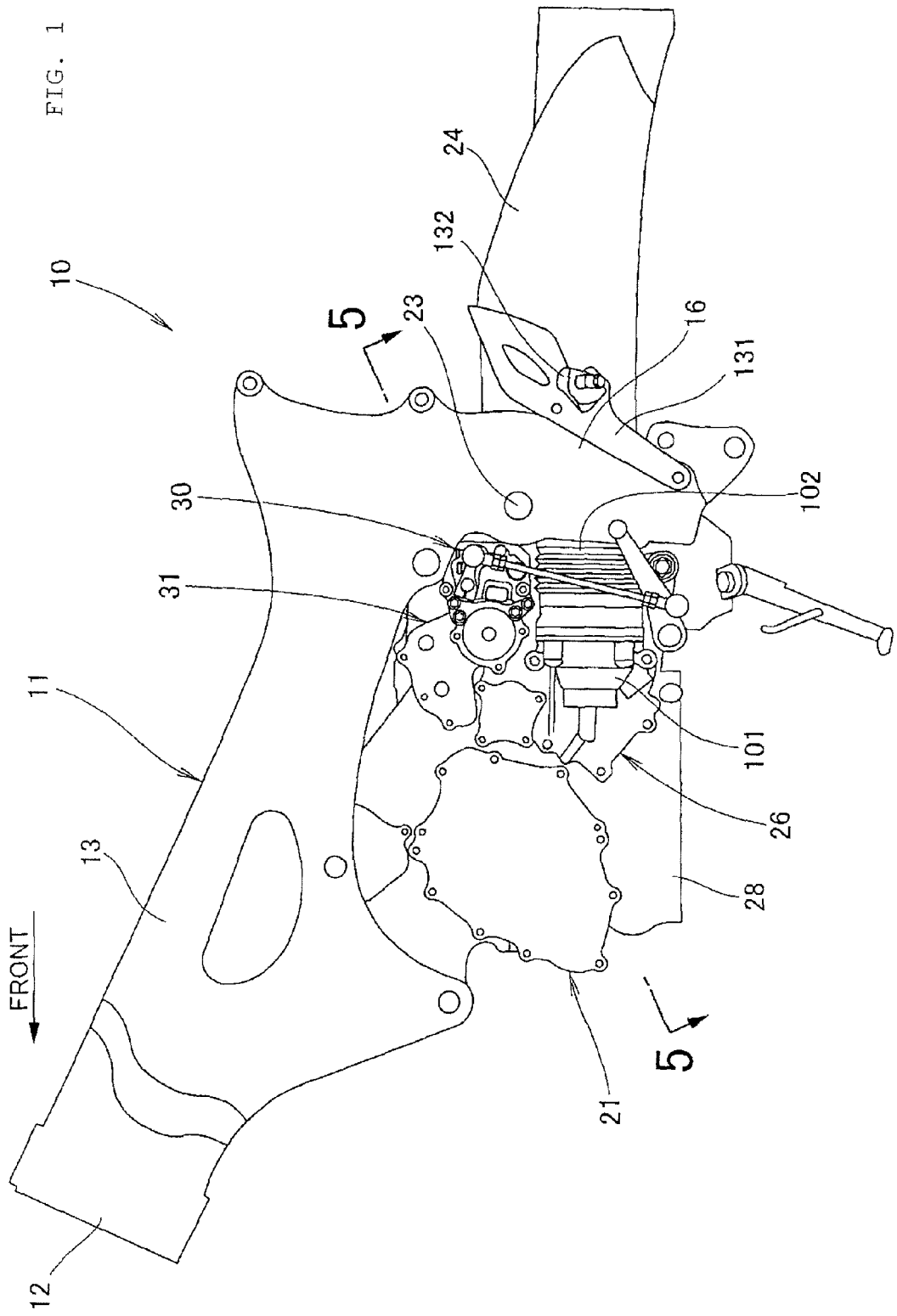
FIG. 1 is a chief section side view showing a transmission control apparatus of a saddle-ride type vehicle according to an embodiment of the present invention.

Descriptions will be provided for embodiments of the present invention on the basis of the attached drawings. Note that terms of the left, right, front and rear used in the descriptions indicate the respective directions from the perspective of a driver which rides the vehicle. In addition, each drawing should be looked at in a direction which enables the reference numerals to be read normally. An arrow (FRONT) shown in each drawing indicates the front of the vehicle.

EXAMPLE 1

Descriptions will be provided for Example 1 of the present invention.

As shown in FIG. 1, in the case of a saddle-ride type vehicle 10, a vehicle body frame 11 includes a head pipe 12, paired left and right main frames 13, 14 (showing only reference numeral 13 on the near side) extending rearward and obliquely downward from this head pipe 12, as well as paired left and right pivot frames 16, 17 (showing only reference numeral 16 on the near side) extending downward from rear end portions of these respective main frames 13, 14. In this example, an engine 21 is attached to the main frames 13, 14 and the pivot frames 16, 17. A swing arm 24 is attached to lower portions of the respective pivot frames 16, 17 by use of a pivot shaft 23 in a way that the swing arm 24 is capable of swinging upward and downward.

A front fork, from which a front wheel is suspended, is attached to the head pipe 12. A rear wheel is attached to a rear end portion of the swing arm 24.

A transmission 26 can be integrally placed in a rear portion of the engine 21. A transmission control apparatus 30 configured to control a shift of the transmission 26 and a transmission drive unit 31 configured to drive a transmission unit 180 (see FIG. 7) placed inside the transmission 26 are placed on a side of the crank case 28 provided to the engine 21 inclusive of this transmission 26.

Note that reference numeral 101 in the drawing denotes an output shaft cover attached to the crank case 28 for the purpose of covering an output shaft of the transmission 26; and 102, a rubber boot with which to connect the output shaft cover 101 and the swing arm 24 together. A drive shaft configured to drive the rear wheel is accommodated inside the output shaft cover 101, the rubber boot 102 and the swing arm 24.

Figure 2:
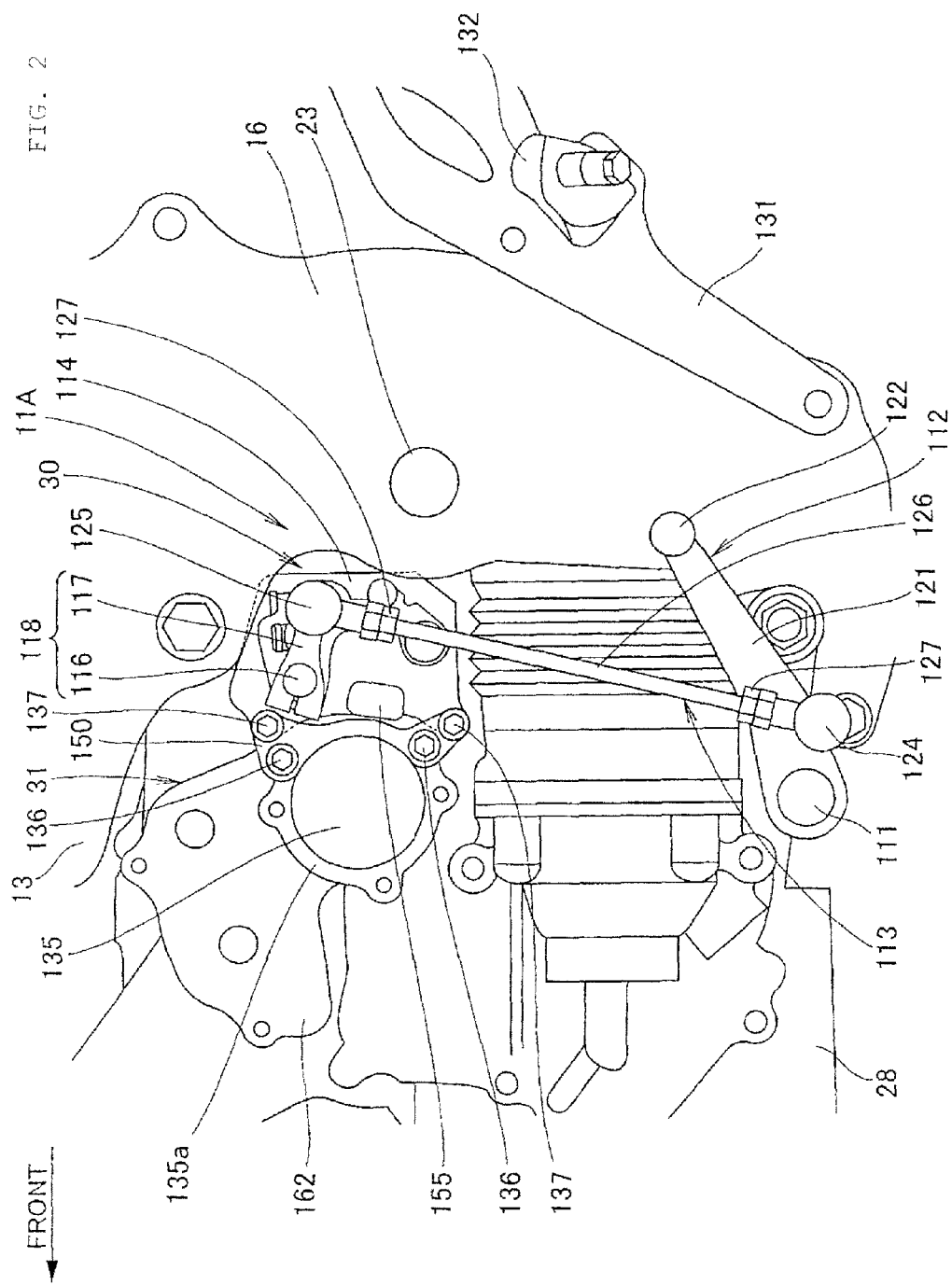
FIG. 2 is another chief section side view showing the transmission control apparatus according to an embodiment of the present invention.

As shown in FIG. 2, the transmission control apparatus 30 can include a spindle 111 attached to the crank case 28, a shift pedal 112 swingably attached to this spindle 111, and a link member 113, an end of which is attached to this shift pedal 112. A support member 114 can be attached to the transmission drive unit 31, a dummy spindle 116 rotatably attached to this support member 114, and a link arm 117 which is attached to the dummy spindle 116, and which is connected to the other end of the link member 113.

The dummy spindle 116 and the link arm 117 are parts constituting the movable part 118.

In a case where the dummy spindle 116 is included in a regular transmission unit which is not of the by-wire type, the dummy spindle 116 can be connected to a shift drum inside the transmission, and is thus capable of being shifted by rotating the shift drum. However, the dummy spindle 116 is not connected to the shift drum, which will be described later.

The shift pedal 112 can include the arm part 121 rotatably attached to the spindle 111, and a pedal part 122 provided in a rear end of this arm part 121.

The link member 113 can include an end portion connecting members 124, 125, and a rod 126 with which to connect these end portion connecting members 124, 125 together. Lock nuts 127, 127 are configured to lock screw connections between these end portion connecting members 124, 125 and the rod 126.

In this example, an end of the end portion connecting member 124 is swingably connected to the shift pedal 112. A male screw provided in an end portion of the rod 126 is screw-connected to a female screw formed in the other end of the end portion connecting member 124.

An end of the end portion connecting member 125 can be swingably connected to the link arm 117. A male screw provided in the other end portion of the rod 126 can be screw-connected to a female screw formed in the other end of the end portion connecting member 125.

Reference numeral 131 in the drawing denotes a step bracket attached to the pivot frames 16, 17. A driver's step 132 is attached to the step bracket 131.

The support member 114, the dummy spindle 116 and the link arm 117 constituting the transmission control apparatus 30 are placed adjacent to a bent portion 11A between the main frame 13 and the pivot frame 16. In addition, the support member 114 is arranged in front of the pivot shaft 23.

The transmission drive unit 31 can include a shift actuator 135 which is an electric motor serving as a driving source. This shift actuator 135 is arranged in front of the support member 114.

The shift actuator 135 includes in this example, a flange portion 135a with which the shift actuator 135 is attached to the crank case 28. An intermediate plate 150 is attached to this flange portion 135a by use of bolts 136, 136. An end portion of the support member 114 is attached to this intermediate plate 150 by use of screws 137, 137. Accordingly, like a cantilever, the support member 114 is attached to the intermediate plate 150.

Figure 3:
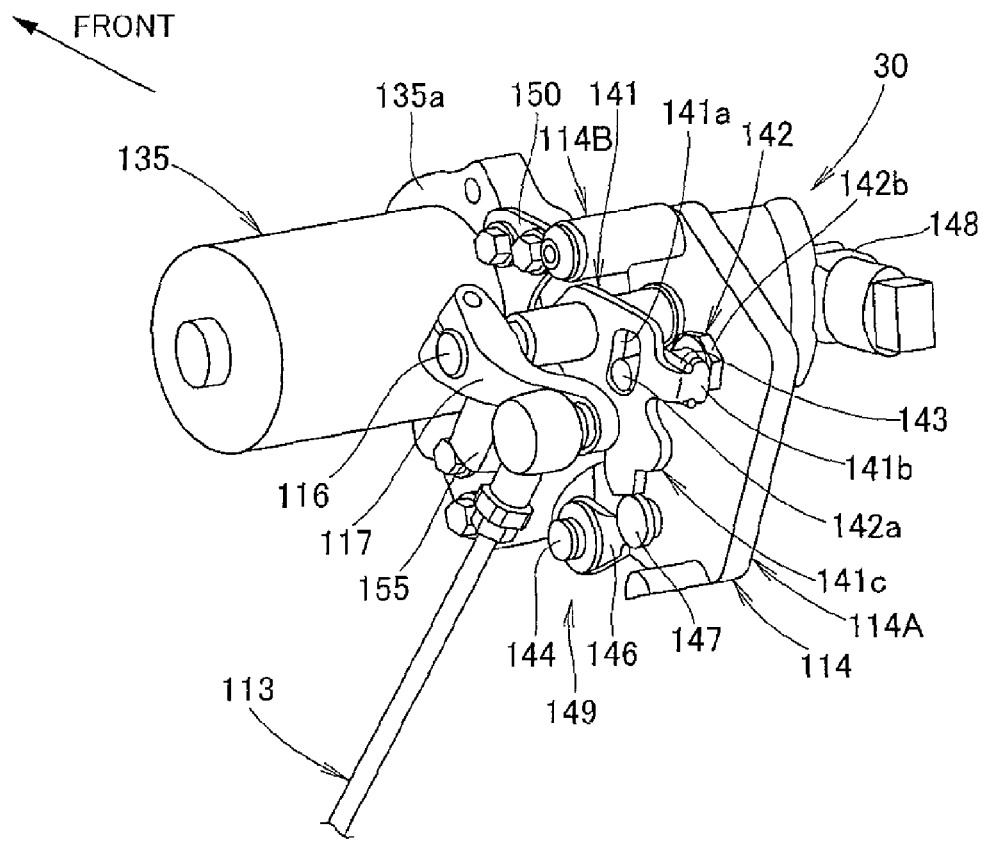
FIG. 3 is a perspective view showing the transmission control apparatus according to an embodiment of the present invention.

As shown in FIG. 3, the transmission control apparatus 30 can include a click feeling generating plate 141 attached to the dummy spindle 116, and a stopper bolt 142 which has a front end portion 142a inserted in a stopper long hole 141a opened in the click feeling generating plate 141 for the purpose of restraining the rotation of click feeling generating plate 141. Stopper bolt 142 also has a base portion 142b attached to the support member 114. Snap pin 143 is wound around the dummy spindle 116, the two ends of which are hooked on the two side edges of a bent portion 141b formed in the click feeling generating plate 141. A spindle 144 can be attached to the support member 114, and an arm 146 is rotatably attached to spindle 144. A shift operation detecting sensor 148 is attached to the rear of the support member 114 for the purpose of detecting the rotation of the dummy spindle 116.

The arm 146 includes a roller 147 which is rotatably attached to an end portion of the arm 146, and which is configured to generate a click feeling in the shift pedal 112 (see FIG. 2) when the roller 147 is pressed to a waveform portion 141c formed in an edge of the click feeling generating plate 141, with an elastic force of an unillustrated elastic member.

The click feeling generating plate 141 and the arm 146 constitute the click feeling generating mechanism 149.

Once the shift pedal 112 is operated, the dummy spindle 116 rotates in response to the movement of the link member 113 and the link arm 117. This rotation is detected by the shift operation detecting sensor 148. On the basis of a signal representing this detection, that is to say, on the basis of a rotational direction and the number of rotary operations of the dummy spindle 116, an unillustrated ECU (Electronic Control Unit) transmits a drive signal to the shift actuator 135 of the transmission drive unit 31, and thus operates the shift actuator 135. Thereby, a predetermined shift in the transmission 26 is carried out corresponding to the operation of the shift pedal 112.

Figure 4:
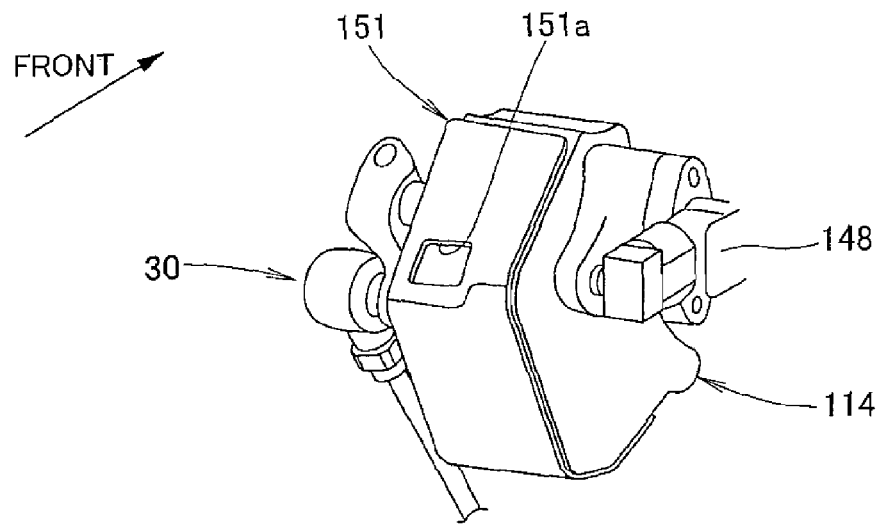
FIG. 4 is a perspective view for explaining a cover covering the transmission control apparatus according to an embodiment of the present invention.

As shown in the example of FIG. 4, a control section cover 151 configured to cover the upper, rear and lower portions of the support member 114 is attached to the support member 114.

A rectangular vent hole 151a is opened in an upper surface of the control section cover 151 in such a way as to be directed upward and obliquely rearward.

For this reason, it is possible to protect the support member 114 of the transmission control apparatus 30 and mechanism parts attached to the support member 114 by use of the control section cover 151. In addition, it is possible to dissipate heat, which is transmitted from the crank case 28 (see FIG. 2), to the outside through the vent hole 151a.

Figure 5:
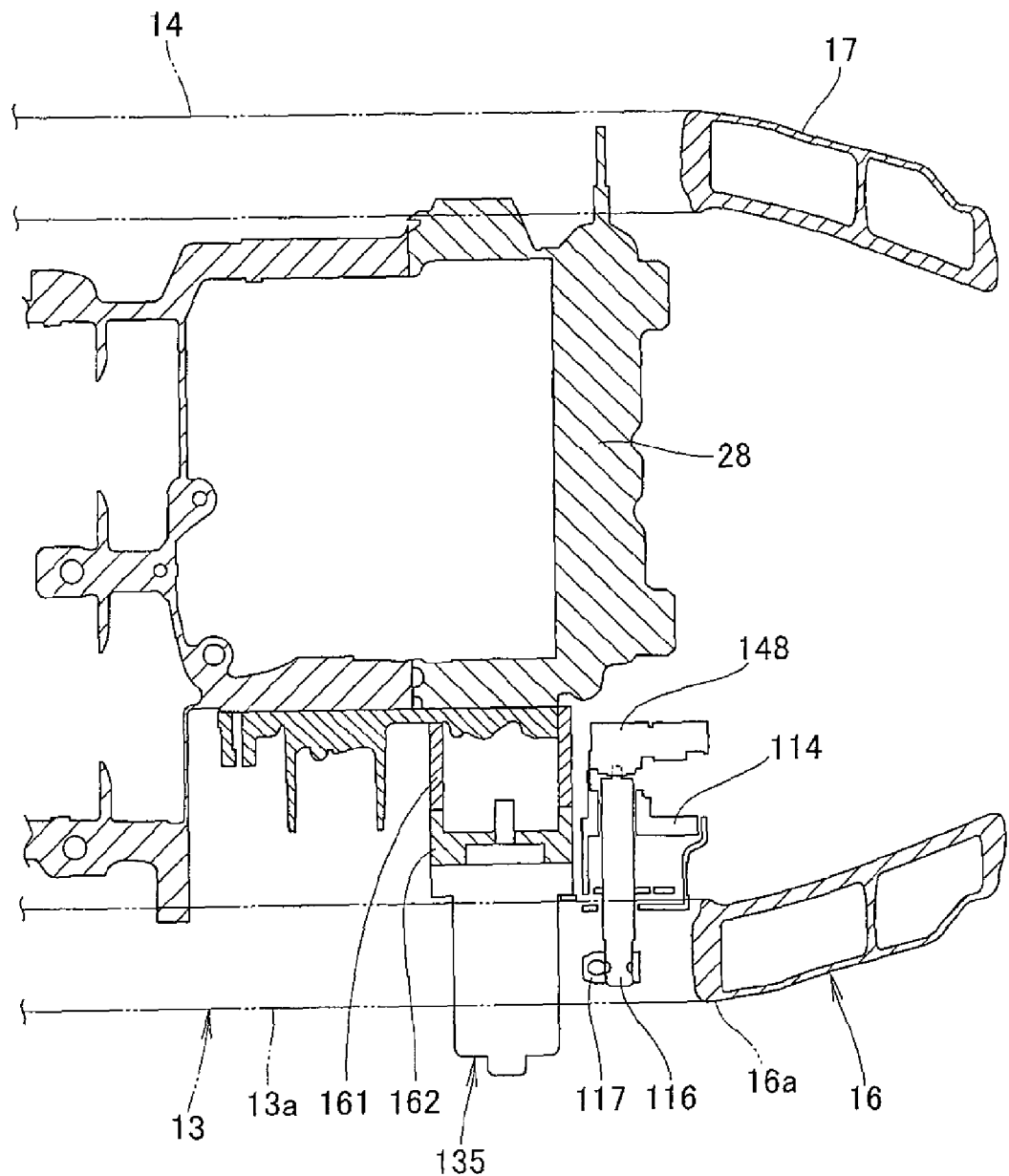
FIG. 5 is a cross-sectional view of the transmission control apparatus taken along the 5-5 line of FIG. 1.

As shown in the example of FIG. 5, the support member 114 is arranged inward of the left main frame 13 and the left pivot frame 16 in the vehicle width direction. Furthermore, the dummy spindle 116 and the link arm 117 are arranged inward of an outer side surface 13a of the main frame 13 and an outer side surface 16a of the pivot frame 16 in the vehicle width direction.

Figure 6:
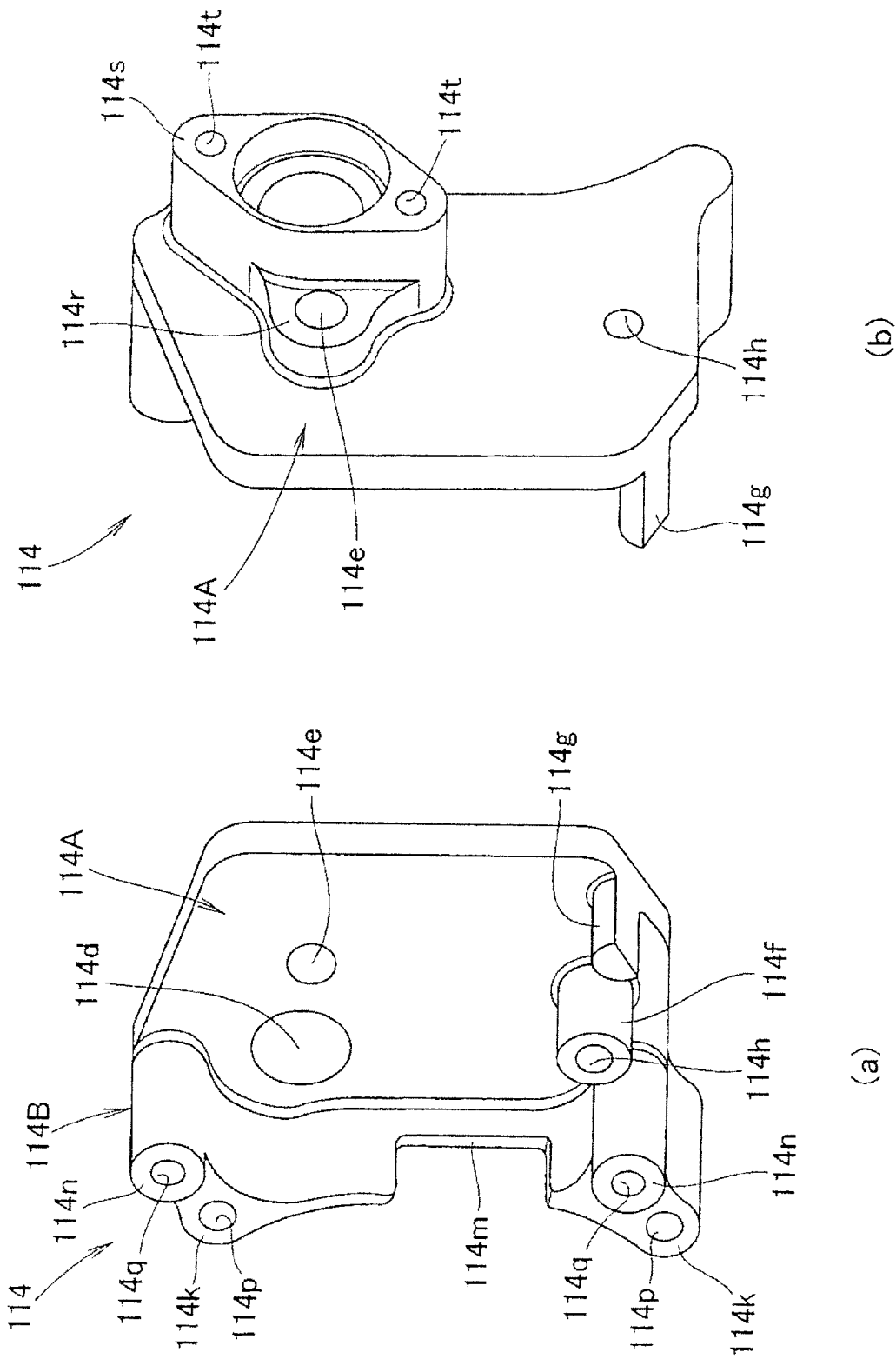
FIG. 6 is a perspective view showing a support member according to an embodiment of the present invention.

Part (a) of FIG. 6 shows a surface of a front side of the support member 114.

As shown in Part (a) of FIG. 6, the support member 114 includes a plate-shaped portion 114A which is shaped like a flat plate, and an upright wall portion 114B which is erected upright from a front edge of this plate-shaped portion 114A.

In FIG. 3 and Part (a) of FIG. 6, the plate-shaped portion 114A includes a dummy spindle insertion hole 114d in which the dummy spindle 116 is rotatably inserted. A stopper bolt attachment hole 114e which is opened in order that the stopper bolt 142 can be attached to the stopper bolt attachment hole 114e. A spindle attachment boss portion 114f is provided, to which the spindle 144 configured to support the arm 146 with a roller is attached. A control section cover positioning protrusion 114g is configured to position the control section cover 151 (see FIG. 4). Note that reference numeral 114h denotes a spindle attachment hole which is opened in order that the spindle 144 can be attached to the spindle attachment hole.

The upright wall portion 114B includes paired intermediate plate attachment bosses 114k, 114k which are attached to the intermediate plate 150. A notch portion 114m is configured to prevent interference between the upright wall portion 114B and the a coupler 155 provided to the shift actuator 135. Paired control section cover attachment bosses 114n, 114n are provided, with which the control section cover 151 is attached to the support member 114. Note that reference numerals 114p, 114p denote bolt insertion holes in which the bolts 136 (see FIG. 2) for attaching the support member 114 to the intermediate plate 150 are inserted. 114q, 114q, denote screw insertion holes in which the screws 137 (see FIG. 2) for attaching the control section cover 151 to the support member 114 are inserted.

Part (b) of FIG. 6 shows a surface of a rear side of the support member 114.

As shown in FIG. 3 and Part (b) of FIG. 6, the plate-shaped portion 114A of the support member 114 includes a first step portion 114r to which the stopper bolt 142 is attached, and a second step portion 114s which is integrally placed adjacent to the first step portion 114r for the purpose of attaching the shift operation detecting sensor 148 to the support member 114. Note that reference numerals 114t, 114t denote sensor attachment screw holes into which bolts for attaching the shift operation detecting sensor 148 to the second step portion 114s are screwed.

Figure 7:
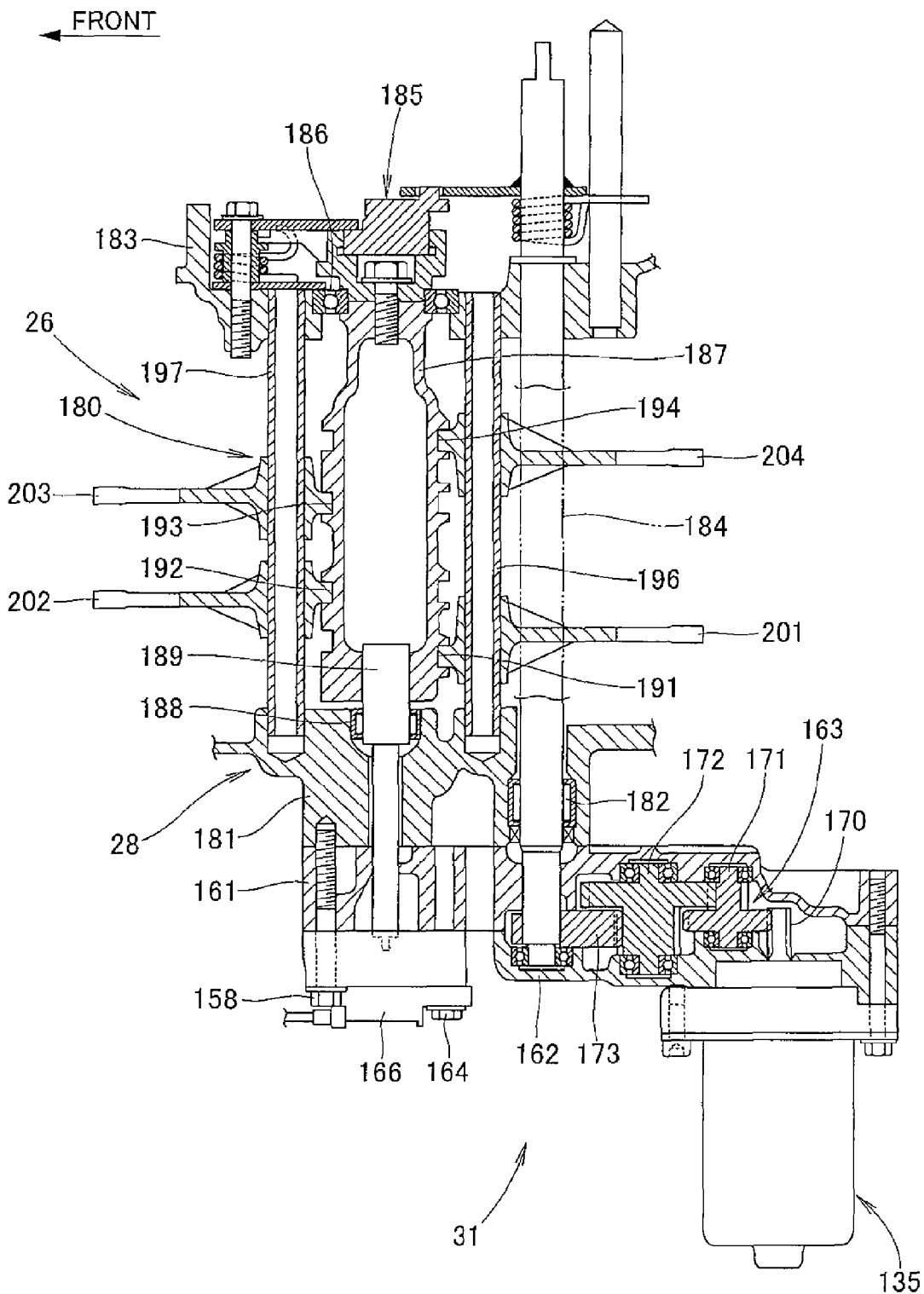
FIG. 7 is a cross-sectional view showing a transmission unit according to an embodiment of the present invention.

As shown in the example of FIG. 7, the transmission drive unit 31 is attached to a side surface of the crank case 28 by use of multiple bolts 158.

The transmission drive unit 31 includes a transmission gear case 161 contiguous to the crank case 28, and a transmission gear cover 162 attached to the transmission gear case 161 with an unillustrated gasket interposed in between. A transmission gear train 163 is accommodated between the transmission gear case 161 and the transmission gear cover 162. The shift actuator 135 can be attached to the transmission gear cover 162, and a gear position sensor 166 is attached to the transmission gear case 161 by use of the bolts 158 and a bolt 164.

The transmission gear train 163 decelerates an output of the shift actuator 135, and thus transmits the resultant output to a shift spindle 184, which will be described later. The transmission gear train 163 includes a first gear 171 meshing with a teeth section provided in the front end of a rotary shaft 170 of the shift actuator 135, and a second gear 172 meshing with this first gear 171. A fan-shaped gear 173 meshes with this second gear 172.

The gear position sensor 166 is a sensor configured to detect a gear position of the transmission 26. A signal representing the gear position from the gear position sensor 166 is transmitted to the ECU.

The transmission 26 includes the transmission unit 180 configured to selectively establish the mesh of gears of a predetermined gear train out of multiple gear trains. In this example, the transmission unit 180 includes a shift spindle 184 which is rotatably attached to a left side wall 181 constituting the crank case 28, with a needle bearing 182 being interposed in between, and which is rotatably inserted in a right side wall 183 constituting the crank case 28. A shift drum 187 is connected to this shift spindle 184 with a shift mechanism 185 being interposed in between, and which is rotatably attached to the crank case 28 with a bearing 186 being interposed in between. An output shaft 189 is attached to an end portion of this shift drum 187 in such a way as to extend in the vehicle width direction (in the vertical direction in the drawing), and which is rotatably attached to the left side wall 181 with a needle bearing 188 being interposed in between. Shift forks 201 to 204 are provided, end portions of which are inserted in multiple annular grooves 191 to 194 formed on the outer peripheral surface of the shift drum 187, and which are rotatably and slidably attached to the shift fork shafts 196, 197 attached to the crank case 28.

An end portion of the shift spindle 184 is attached to the fan-shaped gear 173 of the transmission gear train 163 in the transmission drive unit 31.

In addition, a front end portion of the output shaft 189 is connected to the gear position sensor 166, and the rotation of the output shaft 189 is thus detected by the gear position sensor 166.

Next, descriptions will be provided for how the transmission drive unit 31 and the transmission unit 180 function.

Once the shift actuator 135 operates, the rotation of the rotary shaft 170 of the shift actuator 135 is decelerated by the first gear 171, the second gear 172 and the fan-shaped gear 173 of the transmission gear train 163. Thus, the resultant rotation is transmitted to the shift spindle 184.

As a result, the shift drum 187 rotates via the shift mechanism 185 in response to the rotation of the shift spindle 184.

Once the shift drum 187 rotates, the shift forks 201 to 204 move in the axial direction of the shift drum 187 in response to the undulation of the annular grooves 191 to 194 of the shift drum 187 in the axial direction. Thus, an illustrated main shaft gear and an illustrated counter shaft gear attached, rotatably and movably in their axial directions, to an illustrated main shaft and an illustrated counter shaft that are provided to the transmission 26 move in their axial directions, respectively. Accordingly, the mesh between gears is established so as to be shifted at a predetermined gear position. The gear position at this time is detected by the gear position sensor 166.

Figure 8:
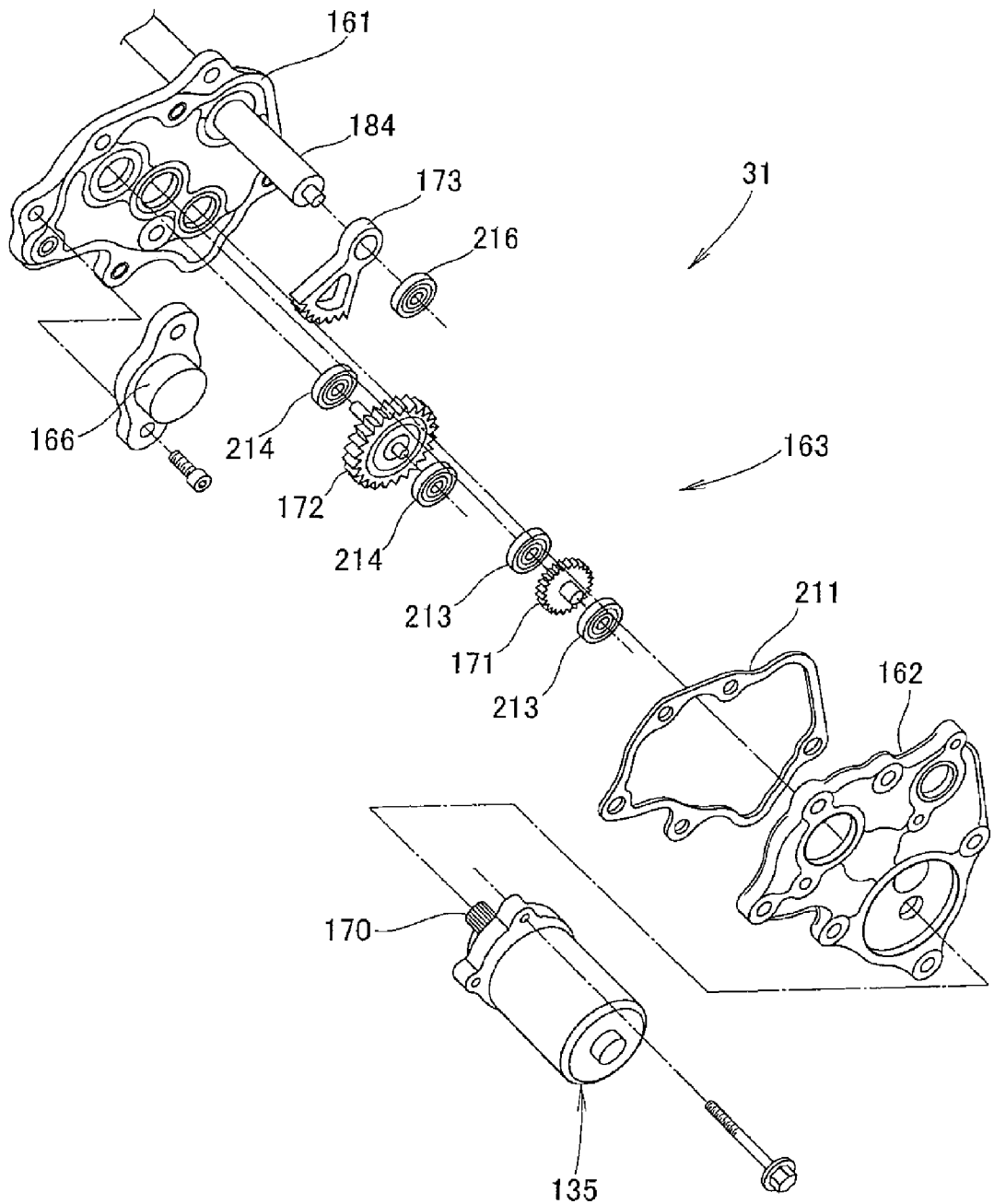
FIG. 8 is an exploded, perspective view showing a transmission drive apparatus according to an embodiment of the present invention.

As shown in FIG. 8, a gasket 211 is placed between the transmission gear case 161 and the transmission gear cover 162 of the transmission drive unit 31. The first gear 171 and the second gear 172, which constitute the transmission gear train 163, are rotatably supported by bearings 213, 213 and bearings 214, 214 which are attached to the transmission gear case 161 and the transmission gear cover 162. The fan-shaped gear 173 is attached to an end portion of the shift spindle 184, and the end portion of the shift spindle 184 is rotatably supported by the transmission gear cover 162 with a bearing 216 being interposed in between.

Figure 9:
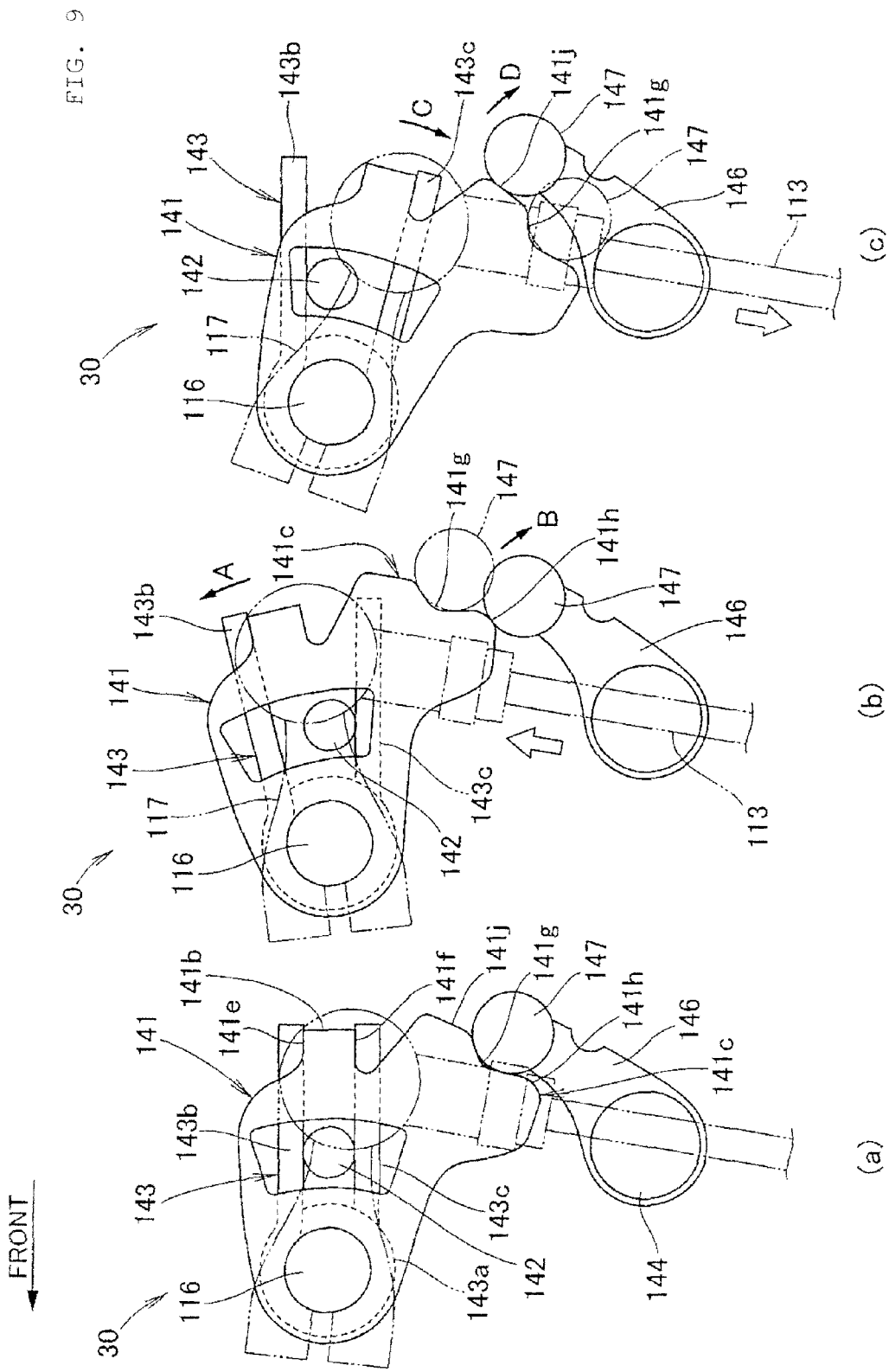
FIG. 9 is a function diagram showing how the transmission control apparatus according to an embodiment of the present invention functions.

Descriptions will be provided for how the above-described transmission control apparatus 30 functions by use of Parts (a) to 9(c) of FIG. 9.

Part (a) of FIG. 9 shows the transmission control apparatus 30 which is in a neutral condition when the shift pedal is not operated.

The snap pin 143 can include a coil portion 143a rotatably wound around the dummy spindle 116, and two branch portions 143b, 143c integrally extending outward in a radial direction from this coil portion 143a in parallel to each other, or almost in parallel to each other. Front end portions of these branch portions 143b, 143c are in contact with two side surfaces 141e, 141f of the bent portion 141b of the click feeling generating plate 141, or are pressed to the two side surfaces 141e, 141f with their elastic forces. Concurrently, the stopper bolt 142 is sandwiched between intermediate portions of the branch portions 143b, 143c.

The waveform portion 141c formed in the edge of the click feeling generating plate 141 can include a valley portion 141g curved toward the dummy spindle 116, and mountain portions 141h, 141j formed on the two respective sides of this valley portion 141g.

As shown in Part (b) of FIG. 9, for instance, once the shift pedal is pulled up with a foot being hooked on the lower portion of the shift pedal for the purpose of shifting the gears up, the link member 113 moves upward as shown by a white arrow.

Once the link member 113 moves upward, the dummy spindle 116 rotates counterclockwise with an assistance of the link arm 117. In response to this, the click feeling generating plate 141 rotates in the same direction. Accordingly, one branch portion 143b of the snap pin 143 is opened out as indicated by an arrow A.

The other branch portion 143c of the snap pin 143 is locked by the stopper bolt 142. For this reason, as the former branch portion 143b is opened wider, an elastic force generated in the snap pin 143 which if applied to the dummy spindle 116 causes the dummy spindle 116 to return clockwise progressively increases. As a result, once the shift pedal is released from the foot after the shift pedal is operated, the shift pedal returns to the original position.

In addition, as the click feeling generating plate 141 rotates together with the link arm 117, the roller 147 moves from the valley portion 141g to the mountain portion 141h, both of which constitute the waveform portion 141c of the click feeling generating plate 141, as indicated by an arrow B. Furthermore, the arm 146 with a roller swings clockwise. Consequently, as a click feeling, the movement and swing are felt by the foot which is operating the shift pedal.

Moreover, as shown in Part (c) of FIG. 9, for instance, once the shift pedal is pressed down by the foot which is placed on the shift pedal for the purpose of shifting the gears down, the link member 113 moves downward as shown by a white arrow.

Once the link member 113 moves downward, the dummy spindle 116 rotates clockwise with the assistance of the link arm 117. In response to this, the click feeling generating plate 141 rotates in the same direction. Accordingly, the other branch portion 143c of the snap pin 143 is opened out as indicated by an arrow C.

The former branch portion 143b of the snap pin 143 is locked by the stopper bolt 142. For this reason, as the other branch portion 143c is opened out wider, an elastic force generated in the snap pin 143 which if applied to the dummy spindle 116 causes the dummy spindle 116 to return counterclockwise progressively increases. As a result, once the shift pedal is let go from the foot after the shift pedal is operated, the shift pedal returns to the original position.

In addition, as the click feeling generating plate 141 rotates together with the link arm 117, the roller 147 moves from the valley portion 141g to the mountain portion 141j, both of which constitute the waveform portion 141c of the click feeling generating plate 141, as indicated by an arrow D. Furthermore, the arm 146 with a roller swings counterclockwise. Consequently, as a click feeling, the movement and swing are felt by the foot which is operating the shift pedal.

EXAMPLE 2

Next, descriptions will be provided for example 2 of the present invention. Components which are the same as those according to Example 1 will be denoted by the same reference numerals, and detailed descriptions for the same components will be omitted.

Figure 10:
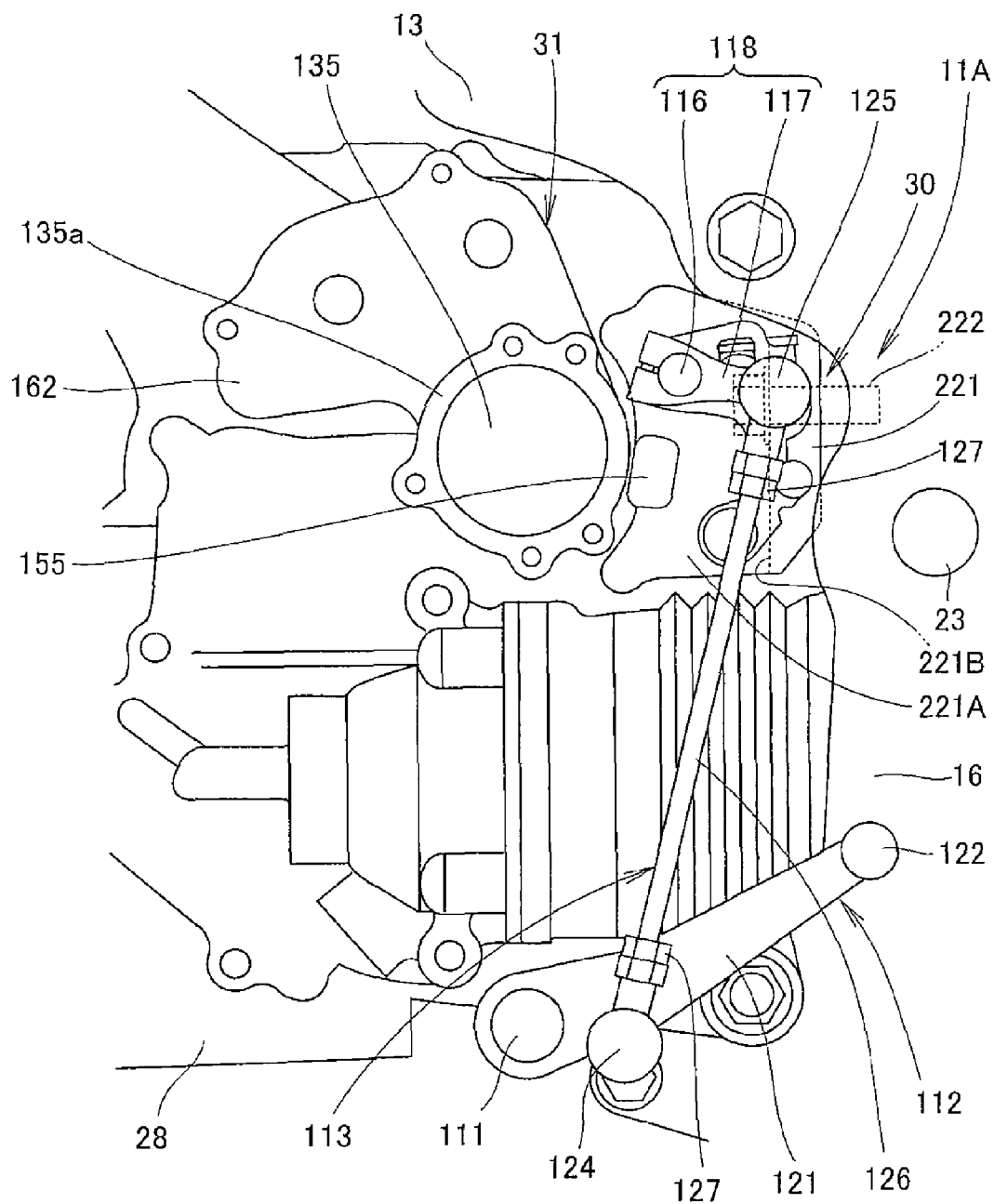
FIG. 10 is a chief section side view showing a transmission control apparatus (Example 2) according to an embodiment of the present invention.

As shown in FIG. 10, a support member 221 configured to support the movable part 118 constituted of the dummy spindle 116 and the link arm 117, includes a plate-shaped portion 221A, and a flange portion 221B integrally extending inward in the vehicle width direction from a rear portion of this plate-shaped portion 221A. The flange portion 221B is attached to a front portion of the pivot frame 16 by use of multiple bolts 222.

Because the support member 221 is attached to the pivot frame 16 constituting the vehicle body frame 11 as described above, it is possible to firmly support the support member 221 by use of the rigid pivot frame 16. Accordingly, it is possible to restrain vibrations of the support member 221.

As shown in FIG. 1, FIG. 2 and FIG. 5, the transmission control apparatus 30 for the saddle-ride type vehicle 10 includes the vehicle body frame 11, the engine 21, the shift pedal 112, the support member 114 and the link member 113. The vehicle body frame 11 can include the main frames 13, 14 extending rearward from the head pipe 12, and the pivot frames 16, 17 extending downward from the rear portions of these main frames 13, 14, respectively. The engine 21 is supported by vehicle body frame 11. The shift pedal 112 is that with which a driver performs a gear-shifting operation. The support member 114 serves as a base part to which the shift operation detecting sensor 148 and the movable part 118 are attached. The shift operation detecting sensor 148 serves as a detector configured to detect the gear-shifting operation. The movable part 118 is that whose operation is detected by this shift operation detecting sensor 148. The link member 113 serves as a link which links the shift pedal 112 and the movable part 118 to each other. The support member 114 is detachably provided to the engine 21. In the transmission control apparatus 30, the support member 114 is adjacent to the bent portion 11A between the main frame 13 and the pivot frame 16, and is attached to the engine 21, in a plan view, inward of the main frame 13 in the vehicle width direction, specifically, attached to the crank case 28 side of the engine 21. For this reason, in the case where the saddle-ride type vehicle 10 receives load from the side, it is possible to effectively protect the support member 114, the shift operation detecting sensor 148 and the movable part 118 by use of the main frame 13 and the pivot frame 16.

As shown in the example of FIG. 2, the support member 114 is placed adjacent to the rear of the shift actuator 135 which is attached to the engine 21, and which is configured to generate a drive force for gear shifting. Accordingly, the shift actuator 135 and the vehicle body frame 11 are arranged around the support member 114. Thus, it is possible to protect the support member 114 by use of the shift actuator 135 and the vehicle body frame 11.

As shown in FIG. 2 as well as parts (a) and (b) of FIG. 6, the support member 114 can include the plate-shaped portion 114A configured to pivotally support the movable part 118, and the upright wall portion 114B which is erected upright from the front edge portion of this plate-shaped portion 114A to the side of the vehicle body. This upright wall portion 114B is attached to the flange portion 135a of the shift actuator 135. Thus, it is possible for the support member 114 to obtain a higher rigidity with which the support member 114 withstands load acting on the support member 114 from the shift pedal 112, when the plate-shaped portion 114A and the upright wall portion 114B are formed in the support member 114. Furthermore, it is possible to make the support member 114 resist resonating with vibrations of the vehicle body.

As shown in the example of FIG. 3, the movable part 118 can include the dummy spindle 116 serving as the rotary shaft which is connected to the shift operation detecting sensor 148, and which is rotatably supported by the support member 114, and the link arm 117 attached to this dummy spindle 116. The click feeling generating plate 141, whose front end is shaped like the waveform, is attached to the dummy spindle 116. The arm 146 with a roller, which is pressed to the waveform portion 141c of the click feeling generating plate 141, is rotatably provided to the plate-shaped portion 114A of the support member 114. Thus, it is possible to place the click feeling generating plate mechanism 149 constituted of the click feeling generating plate 141 and the arm 146 with a roller, in the back of the upright wall portion 114B of the support member 114. Hence, it is possible to provide the transmission control apparatus 30 in a compact manner.

As shown in FIG. 3 and parts (a) to (b) of FIG. 9, the click feeling generating plate 141 is provided with the stopper long hole 141a configured to restrain the rotation, and the bent portion 141b which is bent toward the inside of the vehicle body in such a way as to extend along the dummy spindle 116, and whose end portion is formed wider in order that the branch portions 143b, 143c of the snap pin 143 to be described later should not come off the bent portion 141b. In addition, the plate-shaped portion 114A is provided with the stopper bolt 142 which is inserted in the stopper long hole 141a, and which thus plays a role of a stopper. Furthermore, the coil portion 143a of the snap pin 143 is wound around the dummy spindle 116. The two branch portions 143b, 143c of the snap pin 143 are placed in such a way as to be hooked on the two side surfaces 141e, 141f of the bent portion 141b, and concurrently in such a way as to sandwich the stopper bolt 142. Thus, it is possible to simply configure the stopper mechanism and return mechanism of the shift pedal 112 by including only the click feeling generating plate 141, the stopper bolt 142 and the snap pin 143. Hence, it is possible to reduce manufacturing costs.

As shown in FIG. 4, the rear, upper and lower portions of the support member 114 is covered with the control section cover 151 as the cover, and the vent hole 151a is provided in the upper surface of this control section cover 151. Thus, it is possible for this control section cover 151 to protect the support member 114 and the mechanism parts of the support member 114 by covering them, and it is concurrently possible to prevent heat transmitted from the engine 21 from staying inside the control section cover 151.

The transmission control apparatus according to the present invention is suitable for the saddle-ride type vehicle.

10 saddle-ride type vehicle
11 vehicle body frame
11A bent portion
12 head pipe
13, 14 main frame
16, 17 pivot frame
21 engine
30 transmission control apparatus
112 shift pedal
113 link (link member)
114, 221 base part (support member)
114A, 221A plate-shaped portion
114B upright wall portion
116 rotary shaft (dummy spindle)
117 link arm
118 movable part
135 shift actuator
135a flange portion
141 click feeling generating plate
141a stopper long hole
141b curved portion (bent portion)
142 stopper bolt
143 snap pin
143a coil portion
143b, 143c branch portion
146 arm with a roller
148 detector (shift operation detecting sensor)
151 cover (control section cover)
151a vent hole

We claim:

1. A saddle-ride type vehicle, comprising:
a vehicle body frame including a main frame extending rearward from a head pipe, and a pivot frame extending downward from a rear portion of the main frame;
an engine supported by the vehicle body frame;
a shift pedal with which a driver performs a gear-shifting operation;
a base part to which a detector and a moveable part are attached, the detector being configured to detect the gear-shifting operation, and the moveable part being configured such that an operation thereof is detected by the detector; and
a link which links the shift pedal and the moveable part to each other,
wherein the base part is detachably provided to the engine, and wherein the base part and the movable part are configured, in a plan view, inward of an outer side surface of the main frame in a vehicle width direction,
wherein the base part is disposed adjacent to a rear of a shift actuator which is attached to the engine, and which is configured to generate a drive force for gear shifting.

2. The vehicle according to claim 1, wherein the base part comprises a plate-shaped portion pivotally supporting the moveable part, and an upright wall portion is erected upright from a front edge portion of the plate-shaped portion to a side of a vehicle body, wherein the upright wall portion is attached to a flange portion of a shift actuator.

3. A saddle-ride type vehicle, comprising:
a vehicle body frame including a main frame extending rearward from a head pipe, and a pivot frame extending downward from a rear portion of the main frame;
an engine supported by the vehicle body frame;
a shift pedal with which a driver performs a gear-shifting operation;
a base part to which a detector and a moveable part are attached, the detector being configured to detect the gear-shifting operation, and the moveable part being configured such that an operation thereof is detected by the detector; and
a link which links the shift pedal and the moveable part to each other,
wherein the base part is detachably provided to the engine, and wherein the base part and the movable part are configured, in a plan view, inward of an outer side surface of the main frame in a vehicle width direction,
wherein the moveable part comprises:
a rotary shaft connected to the detector, said rotary shaft being rotatably supported by the base part, and a link arm is attached to the rotary shaft,
wherein a click feeling generating plate is attached to the rotary shaft, the click feeling generating plate having a front end formed in a waveform portion, and wherein an arm with a roller is rotatably provided to the plate-shaped portion of the base part, said arm with the roller being pressed to the waveform portion of the click feeling generating plate.

4. The vehicle according to claim 3, wherein
the click feeling generating plate further comprises a stopper long hole configured to restrain a rotation of the click feeling generating plate, and a curved portion which is bent toward an inside of the vehicle body in such a way as to extend along the rotary shaft, and having a widened end portion, wherein the plate-shaped portion is provided with a stopper bolt which is inserted in the stopper long hole, and which functions as a stopper,
wherein a coil portion of a snap pin is wound around the rotary shaft, and wherein two branch portions of the snap pin are configured to be hooked around two side edges of the curved portion, and configured so as to sandwich the stopper bolt.

5. A saddle-ride type vehicle, comprising:
a vehicle body frame including a main frame extending rearward from a head pipe, and a pivot frame extending downward from a rear portion of the main frame;
an engine supported by the vehicle body frame;
a shift pedal with which a driver performs a gear-shifting operation;
a base part to which a detector and a moveable part are attached, the detector being configured to detect the gear-shifting operation, and the moveable part being configured such that an operation thereof is detected by the detector;
a link which links the shift pedal and the moveable part to each other, wherein the base part is detachably provided to the engine, and wherein the base part and the movable part are configured, in a plan view, inward of an outer side surface of the main frame in a vehicle width direction; and a cover which is configured to cover rear, upper, and lower portions of the base part, said cover including a vent hole provided in an upper surface thereof.

6. A saddle-ride type vehicle, comprising:
frame means for supporting vehicle components thereupon, said frame means including a main frame extending rearward from a head pipe and a pivot frame extending downward from a rear portion of the main frame;
drive means for providing drive power for the vehicle, said drive means supported by the vehicle frame;
shift means for initiating a gear-shifting operation upon user actuation thereof;
base means for supporting shifting components thereupon, said base means having detector means and moving means thereupon, said detector means for detecting the gear-shifting operation, said moving means for movement during the gear-shifting operation, said detector means being configured to detect movement of the moving means;
link means for linking the shift means and the moving means to each other,
wherein the base means is detachably provided to the drive means, and wherein the base means and the moving means are disposed, in a plan view, inward of an outside surface of the main frame in a vehicle width direction,
wherein the moving means comprises shaft means connected to the detector means, said shaft means being rotatably supported by the base part, and wherein link arm means is attached to the shaft means, wherein a click generating means is attached to the shaft means, said click generating means for generating a click feeling, and having a front end formed in a waveform portion, and wherein arm means is rotatably provided to the plate-shaped-portion of the base means, said arm means being pressed to the wave form portion of the click generating means.

7. A vehicle according to claim 6, wherein the click generating means comprises restraining means for restraining a rotation of the click generating means, and a curved portion which is bent toward an inside of the vehicle body in such a way as to extend along the shaft means, and having a widened end portion, wherein the plate-shaped-portion includes stopper means which is inserted in the restraining means, for functioning as a stopper, and wherein a pin means comprising a core portion is disposed around the shaft means, wherein two branch portions of the pin means are hooked around two side edges of the curved portion, and configured so as to sandwich the stopper means.

8. A saddle-ride type vehicle, comprising:
frame means for supporting vehicle components thereupon, said frame means including a main frame extending rearward from a head pipe and a pivot frame extending downward from a rear portion of the main frame;
drive means for providing drive power for the vehicle, said drive means supported by the vehicle frame;
shift means for initiating a gear-shifting operation upon user actuation thereof;
base means for supporting shifting components thereupon, said base means having detector means and moving means thereupon, said detector means for detecting the gear-shifting operation, said moving means for movement during the gear-shifting operation, said detector means being configured to detect movement of the moving means;
link means for linking the shift means and the moving means to each other, wherein the base means is detachably provided to the drive means, and wherein the base means and the moving means are disposed, in a plan view, inward of an outside surface of the main frame in a vehicle width direction; and
cover means for covering at least rear, upper, and lower portions of the base means, said cover means including a vent hole provided in an upper surface thereof.

9. A transmission control apparatus for a saddle-ride type vehicle, comprising:
a base section;
a detector attached to said base section;
a moveable section attached to said base section, said moveable section being configured to be moved upon an initiation of a gear-shifting operation by a user via a link,
wherein the detector is configured to detect the gear-shifting operation through detection of movement of the moveable section, wherein the base section is detachably provided to the engine, and wherein the base section is configured to be detachably provided to a vehicle, and wherein the base section and the moveable section are configured, in a plan view, to be disposed inward of an outer side surface of a main frame of a vehicle in a vehicle width direction,
wherein the moveable section comprises:
a rotary shaft connected to a detector, said rotary shaft being rotatably supported by the base section, whereby a link arm is attached to the rotary shaft;
a click generating plate attached to the rotary shaft, said click generating plate having a front end formed in a waveform portion; and
an arm with a roller being rotatably provided to the plate-shaped-portion of the base section, said arm with the roller being pressed to the waveform portion of the click generating plate.

* * * * *